(No Model.)
C. C. CLAY.
NUT LOCK.
No. 444,816. Patented Jan. 20, 1891.
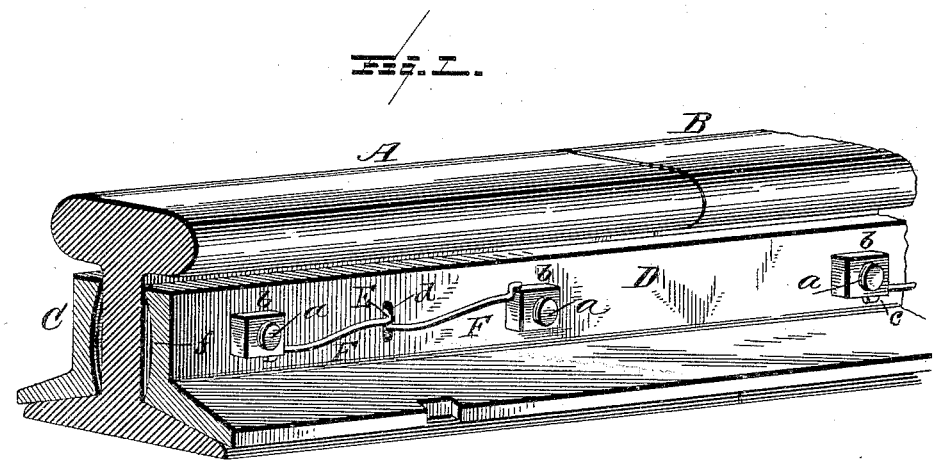
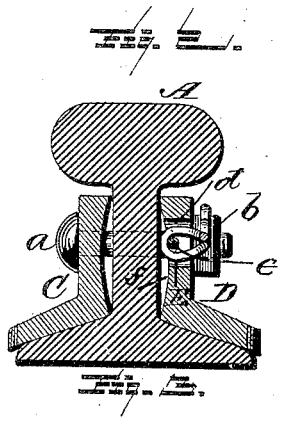
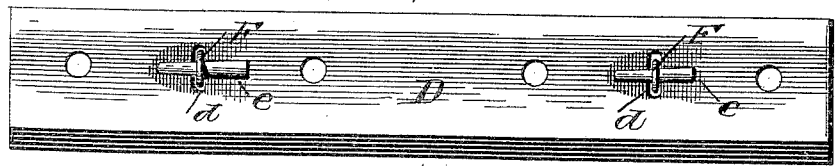
Witnesses
L. C. Hills
Jno. O'Connell
Inventor
Cyrus C. Clay,
per Chas. H. Fowler
Attorney

UNITED STATES PATENT OFFICE.

CYRUS C. CLAY, OF ELMHURST, PENNSYLVANIA.

NUT-LOCK.

SPECIFICATION forming part of Letters Patent No. 444,816, dated January 20, 1891.

Application filed November 8, 1890. Serial No. 370,756. (No model.)

*To all whom it may concern:*

Be it known that I, CYRUS C. CLAY, a citizen of the United States, residing at Elmhurst, in the county of Lackawanna and State of Pennsylvania, have invented certain new and useful Improvements in Nut-Locks; and I do hereby declare that the following is a full, clear, and exact description of the same, reference being had to the annexed drawings, making a part of this specification, and to the letters of reference marked thereon.

Figure 1 of the drawings represents a perspective view of the adjoining ends of two sections of rail and the fish-plates thereof, showing the application of my improved nut-lock thereto; Fig. 2, a transverse section thereof; Fig. 3, an inner side plan view of one of the fish-plates, showing the manner of attaching the nut-locking device thereto; Fig. 4, a detail view in perspective of the locking device.

The present invention has for its object to provide a simple and effective device for locking the nuts upon bolts and thereby prevent their turning, which object I attain by the construction substantially as shown in the drawings and hereinafter described and claimed.

In the accompanying drawings, A B represents the adjoining ends of two rails, which are held together by the usual fish-plates C D and the bolts and nuts $a$ $b$, the bolts passing through the rails and fish-plates, as shown.

The locking device consists of a spring-wire bent at its middle to form a spring-loop E and spring-arms F extending out from the sides of the loop, and the extremity of the arms, if so preferred, may have a right-angle bend, as shown at $c$, to overlap the sides of the nuts, as shown in Fig. 1 of the drawings. The loop E performs a double function in that it increases the spring or elasticity of the arms F and also provides means for connecting the device to the fish-plate D, which has slots $d$ midway between the bolt-holes.

The nut-locking device above described is held to the fish-plate by means of a key $e$, which passes through the loop after it has been inserted through the slot $d$, the loop projecting beyond the inner face of the fish-plate sufficiently to admit of the key being engaged with the loop, and to further facilitate its engagement with the loop the inner side of the fish-plate is made concave, as shown at $f$. The extremities of the arms F, when the device is in position, will bear against the nuts, as shown in Fig. 1, and will catch the nut at every quarter-revolution and hold it from working off the bolt.

A very cheap and effective as well as simple device is provided for effectually preventing the nuts from working off their bolts, and the manner of attaching it to the fish-plate renders the device easily and readily applied and as readily detached from the fish-plate when required.

Having now fully described my invention, what I claim as new, and desire to secure by Letters Patent, is—

In a device for locking nuts on bolts, the combination, with a plate having a slot, of a device composed of spring-wire and having a loop and arms extending from the sides of said loop, and a key for holding the loop in engagement with the plate after the same has been inserted through the slot, substantially as and for the purpose set forth.

In testimony that I claim the above I have hereunto subscribed my name in the presence of two witnesses.

CYRUS C. CLAY.

Witnesses:
A. B. HOLMES,
BERT EDWARDS.